United States Patent Office 3,282,689
Patented Nov. 1, 1966

3,282,689
WELDING WIRE CONSISTING OF NICKEL-TITANIUM-CARBON-SILICON-COPPER
John J. Santner, Wauwatosa, Wis., assignor to Allis-Chalmers Manufacturing Company, Milwaukee, Wis.
No Drawing. Filed July 3, 1963, Ser. No. 292,766
4 Claims. (Cl. 75—170)

This invention is related generally to welding wire. More particularly, this invention relates to close chemical tolerances for a "Monel" (T.M. The International Nickel Co., Inc., Huntington Alloy Products Division, Huntington 17, West Virginia) welding wire.

Monel, a nickel-copper alloy, is widely used in industrial and naval applications where high strength and resistance to corrosion are required. The alloy is quite resistant to many common corrosives such as sea water, sulfuric acid and strong caustic solutions.

In some naval applications it is desirable to deposit such a nickel-copper alloy as a weld overlay onto a steel base material. For such applications in the United States Navy, military specifications closely control the quality of the weld overlay as well as the chemical composition of the deposited alloy. Military specification (MIL E 21562B) from the Bureau of Ships lists the close specifications the Navy requires for nickel alloy weld deposits. In this military specification a Monel alloy (EN 60) is included. These Navy specifications provide that the alloy (EN 60) must be within a chemical composition as shown in Table I below:

Table I.—Chemical composition of EN 60 electrodes and rods (from MIL E 21562B)

| | Percent |
|---|---|
| Nickel | 62–69 |
| Carbon, max. | 0.15 |
| Manganese, max. | 1.00 |
| Iron, max. | 2.50 |
| Sulfur, max. | 0.02 |
| Silicon, max. | 1.50 |
| Aluminum, max. | 1.25 |
| Titanium | 1.5–3.0 |
| Total other elements, max. | 0.5 |
| Copper | Balance |

Besides this chemistry control the weld deposit must have a tensile strength of 70,000 p.s.i. minimum and must be substantially free from cracks and fissures.

Contractors for the United States Navy the country over have experienced extreme difficulty in meeting this specification, especially where automatic welding devices are utilized. It seems that whenever the chemistry of the weld deposit falls within specification, the deposit will have a large number of minute cracks and fissures. Furthermore, this welding wire is often characterized by poor weldability wherein erratic spark actions cause rough and irregular weld deposits. As a result many corporate contractors have avoided to bid on Navy contracts calling for EN 60 weld deposits or must resort to expensive and time consuming hand welding techniques. Because of such complications suppliers of weld wire will not guarantee that the weld deposit will pass specifications insofar as cracks and fissures are concerned.

Many attempts and studies have been made to prevent these cracks and fissures from forming. Most of the studies have led persons skilled in the art to believe that the cracks and fissures can be eliminated only by using wire which is low in carbon and high in manganese. However, even for these low carbon and high manganese wires, the cracks and fissures still appear unless the manganese content is taken to levels higher than the Navy specification will allow.

I have found, however, that the cracks, fissures and poor weldability can be completely eliminated in automatic welding of EN 60 wire if the carbon and silicon contents are more critically controlled but yet still maintained within the Navy's specification.

Accordingly, it is an object of this invention to provide an EN 60 welding wire which has a chemical composition within the Navy specification (MIL E 21562B) and which can easily be deposited by automatic welding devices without cracks and fissures.

It is another object of this invention to provide a method for welding EN 60 welding wire which results in a crack and fissure free deposit.

These and other objects and advantages as shall become apparent are fulfilled by this invention as shall be deemed from the following detailed description.

The Navy specification provides for a carbon content of 0.15 percent maximum. Thus any carbon content within the range of from 0 to 0.15 percent will fall within specification. I have found, however, quite unexpectedly and presently unexplainably, that EN 60 welding wire having carbon contents in the lower half of this 0 to 0.15 percent range is greatly susceptible to cracks and fissures when welded. Thus the first step in the elimination of cracks and fissures is to assure that the carbon content of the wire is at least 0.08 percent. Therefore, any carbon content in the range of from 0.08 to 0.15 percent will be sufficient for the purposes of this invention and yet will remain within the Navy specification as listed in MIL E 21562B.

In addition to maintaining the higher carbon content, the silicon content must also be closely controlled. Thus, to completely insure the elimination of cracks and fissures, I discovered that the silicon should be maintained in the range of from 0.4 to 0.6 percent, being somewhat dependant upon the given carbon content; that is to say that the silicon content should be from two to four times greater than the carbon content. From this then it would appear that the silicon content could vary from 0.16 percent (for the 0.08 carbon) to 0.60 percent (for the 0.15 carbon). This silicon range however, is not the complete answer since I have further learned that silicon contents below 0.4 percent give a wire that has very poor weldability because the arc action is erratic. This gives a weld having very poor bead shape (berries). Thus for best results the silicon content should be from two to four times greater than the given carbon content, but not less than about 0.4 percent. From this the limits of 0.4 to 0.6 percent silicon are apparent. Table II below more clearly illustrates the ideal silicon content necessary as a function of the carbon content.

Table II.—Silicon content necessary in EN 60 wire per given carbon content

| Percent Carbon | Percent Silicon |
|---|---|
| 0.08 | 0.4 |
| 0.09 | 0.4 |
| 0.10 | 0.4 |
| 0.11 | 0.4 to 0.44 |
| 0.12 | 0.4 to 0.48 |
| 0.13 | 0.4 to 0.52 |
| 0.14 | 0.4 to 0.56 |
| 0.15 | 0.4 to 0.50 |

These chemistries, as noted in Table II, would be rather hard to control since the silicon content for the lower carbons is quite limited. Accordingly, for general industrial applications, satisfactory results could be obtained from any silicon content in the range of 0.4 to 0.6 percent for any carbon in the 0.08 to 0.15 percent range.

Maintaining such a carbon and silicon content in the alloy would be a substantial departure from the usual practice. Although such limits as my invention discloses could inadvertently result from merely staying within the Navy specification, such carbon and silicon contents would in all probability not be attained without intent. This is because carbon and silicon in this alloy have been merely regarded as tolerable impurities and not elements to be desired. It has been the general feeling in the industry that the lower the carbon content the more corrosion resistant the alloy would be. Thus heats having the lower carbon and silicon contents have been considered the more desirable heats. As a result, producers have strived to keep the carbon and silicon levels rather low, so that the typical carbon content of this wire in the past has been 0.02 percent area. Furthermore it is believed in the art that the cracks and fissures are due to high carbon levels so that extra efforts are being made to obtain wire of even lower carbon levels.

The embodiments of the invention in which an exclusive property or privilege is claimed are defined as follows:

1. A welding wire consisting essentially of 62 to 69 percent nickel, 1.5 to 3.0 percent titanium, 0.08 to 0.15 percent carbon, 0.4 to 0.6 percent silicon, and the balance being copper.

2. A welding wire consisting essentially of 62 to 69 percent nickel, 1.5 to 3.0 percent titanium, 0.08 to 0.15 percent carbon, a silicon content in the range of from two to four times greater than the carbon content, but not less than about 0.4 percent, and the balance being copper.

3. A welding wire consisting essentially of the chemical composition:

| | Percent |
|---|---|
| Nickel | 62 to 69 |
| Iron, max. | 2.50 |
| Manganese, max. | 1.00 |
| Sulfur, max. | 0.02 |
| Aluminum, max. | 1.25 |
| Titanium | 1.5 to 3.0 |
| Silicon | 0.4 to 0.6 |
| Carbon, max. | 0.08 to 0.15 |
| Total other elements, max. | 0.5 |
| Copper | Balance |

4. A welding wire consisting esesntially of the chemical composition:

| | |
|---|---|
| Nickel | 62 to 69%. |
| Iron | 2.50% max. |
| Manganese | 1.00% max. |
| Sulfur | 0.02% max. |
| Aluminum | 1.25% max. |
| Titanium | 1.5 to 3.0%. |
| Silicon | 2 to 4 times greater than the carbon content but less than 0.4%. |
| Carbon | 0.08 to 0.15% max. |
| Total other elements | 0.5% max. |
| Copper | Balance. |

References Cited by the Examiner

Hinde, British Commonwealth Welding Conference, 1957, pp. 103–107.

Hinde et al., British Welding Journal, 1955, volume 2, pp. 411–419.

DAVID L. RECK, *Primary Examiner.*

WINSTON A. DOUGLAS, HYLAND BIZOT,
*Examiners.*

C. M. SCHUTZMAN, R. O. DEAN, *Assistant Examiners.*

UNITED STATES PATENT OFFICE
CERTIFICATE OF CORRECTION

Patent No. 3,282,689                             November 1, 1966

John J. Santner

It is hereby certified that error appears in the above numbered patent requiring correction and that the said Letters Patent should read as corrected below.

Column 4, line 24, after "but" insert -- not --.

Signed and sealed this 5th day of September 1967.

(SEAL)
Attest:

ERNEST W. SWIDER                             EDWARD J. BRENNER
Attesting Officer                                   Commissioner of Patents